United States Patent [19]

Kuratani

[11] Patent Number: 4,573,106

[45] Date of Patent: Feb. 25, 1986

[54] ILLUMINATED SLIDE RHEOSTAT

[75] Inventor: Junichi Kuratani, Miyagi, Japan

[73] Assignee: Alps Electric Co., Ltd., Japan

[21] Appl. No.: 636,582

[22] Filed: Aug. 1, 1984

[30] Foreign Application Priority Data

Aug. 1, 1983 [JP] Japan ........................... 58-118635[U]

[51] Int. Cl.³ ............................................. G01D 11/28

[52] U.S. Cl. ......................................... 362/28; 362/30; 362/278; 362/800; 338/74; 338/154

[58] Field of Search ........................ 362/25, 26, 28, 29, 362/30, 800, 278; 338/74, 114, 154, 199, 219

[56] References Cited

U.S. PATENT DOCUMENTS

| | | | |
|---|---|---|---|
| 2,596,166 | 5/1952 | Peterson | 338/219 X |
| 3,017,594 | 1/1962 | Rodgers | 11/219 |
| 3,764,953 | 10/1973 | Lehnert | 338/154 |
| 3,772,629 | 11/1973 | Meylan-Rochat | 338/154 |
| 4,006,402 | 2/1977 | Mincuzzi | 338/32 R X |
| 4,163,204 | 7/1979 | Sado et al. | 338/114 |
| 4,203,088 | 5/1980 | Sado et al. | 338/114 |
| 4,210,895 | 7/1980 | Sado et al. | 338/114 X |
| 4,252,391 | 2/1981 | Sado | 338/114 X |
| 4,355,347 | 10/1982 | Guthrie | 362/29 X |
| 4,380,043 | 4/1983 | Takamatsu et al. | 362/26 |
| 4,453,200 | 6/1984 | Trcka et al. | 362/29 X |

FOREIGN PATENT DOCUMENTS

| | | | |
|---|---|---|---|
| 2415335 | 9/1979 | France | 362/29 |
| 2007842 | 5/1979 | United Kingdom | 362/29 |

*Primary Examiner*—Peter A. Nelson
*Attorney, Agent, or Firm*—Guy W. Shoup

[57] ABSTRACT

A slide rheostat having a light-emitting device for permitting a person to check the position of the knob of the rheostat in the nighttime or in the dark. The rheostat includes a transparent upper baseplate, a transparent lower baseplate, a laminated sheet including a pressure-sensitive contact member, a transparent sliding body that reciprocates, the knob being formed on the sliding body, an indicator portion having a transparent region, and a pressure-applying member. The light-emitting device is disposed below the lower baseplate rather than on the knob carried by the sliding body. When the light-emitting device is lit, the emitted light is transmitted through the lower baseplate, the laminated sheet, the upper baseplate, and the transparent region of the indicator portion that has a scale thereon. Part of the light directly reaches the outside through this transparent region, while the other part arrives at the outside after passing through the knob.

3 Claims, 6 Drawing Figures

ILLUMINATED SLIDE RHEOSTAT

FIELD OF THE INVENTION

The present invention relates to an illuminated slide rheostat which has a light source to permit a person to see its knob in the nighttime.

BACKGROUND OF THE INVENTION

It is known that a slide rheostat used for control of a tone volume has a light-emitting device installed on a knob that reciprocates on a guide member, the light-emitting device being electrically connected to a power supply for indication of the tone control position of the knob. In this prior art construction, since the light-emitting device is installed on the reciprocating knob, the electrical connection between the light-emitting device and the power supply is complex, and the knob is large. Hence, it has been difficult to make the illuminated slide rheostat thin. Another disadvantage is that the position of the knob relative to the indicator portion cannot be easily checked, because the indicator portion is illuminated by the light emanating from the light-emitting device that is carried on the knob.

SUMMARY OF THE INVENTION

It is the main object of the present invention to provide an illuminated slide rheostat which can be fabricated in the form of a thin construction and is free of the foregoing difficulties with the prior art device and which permits a person to check the position of the knob relative to the indicator portion with ease.

This object is achieved in accordance with the teachings of the present invention by providing an illuminated slide rheostat comprising: an upper baseplate and a lower baseplate both of which are made from a material having a good transparency; a lower sheet including a resistance layer; a pressure-sensitive sheet which, when pressed, cooperates with the resistance layer to form an electrically conductive path; an upper sheet having electrodes which can be electrically connected with the pressure-sensitive sheet; an insulating sheet that insulates the resistance layer from the electrodes; the lower sheet, the pressure-sensitive sheet, the upper sheet, and the insulating sheet being disposed between the upper baseplate and the lower baseplate; an indicator portion formed in the upper baseplate and having a transparent region; a guide member installed in the upper baseplate and extending straight; a sliding body made from a material having a good transparency and fitted in the guide member in such a way that it can reciprocate; a knob formed on the sliding body and moving on the indicator portion; and a pressure applying member installed in the sliding member and sliding on the pressure-sensitive sheet.

Further objects, features, and advantages of the invention will become apparent from a consideration of the following description, the appended claims, and the accompanying drawings.

DETAILED DESCRIPTION OF THE INVENTION

Figure 3:
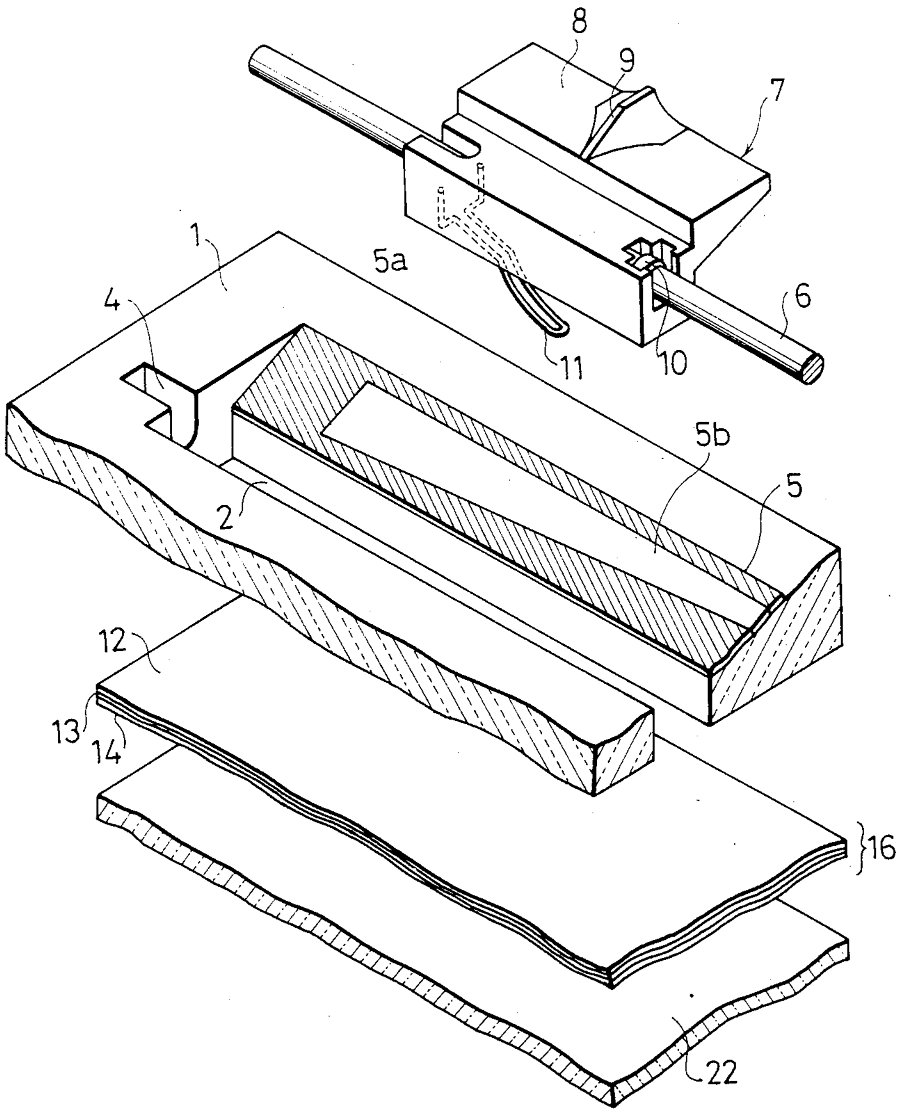
FIG. 3 is an exploded perspective view of the rheostat shown in FIG. 1.

With reference to the drawings, a slide rheostat embodying the concept of the invention has an upper baseplate 1 made from a synthetic resin having a good transparency such as acrylic resin. The baseplate 1 is provided with a slot 2 for sliding movement (described later), and has a tapering surface 3 tilted toward the slot 2 from the upper surface of the baseplate 1. Further, the baseplate 1 is formed with a pair of retaining grooves 4 at both ends of the slot 2. An indicator portion 5 is formed by printing a desired scale on a sheet of transparent film. A hatched portion shown in FIG. 3 constitutes an opaque region 5*a* that surrounds a triangular transparent region 5*b*, which serves as a scale and is stuck to the tapering surface 3. A shaft 6 acting as a guide member has both ends fixed in the retaining grooves 4 by adhesive or similar means. A sliding body 7 is made from a synthetic resin having a good transparency such as acrylic resin, and is provided with a flat knob 8. This knob 8 has a protruded central portion on which an opaque pointer 9 is formed by application of ink or the like. The sliding body 7 is fitted over the guide shaft 6 together with a ring 10 of silicone rubber such that it can slide along the shaft 6. When the sliding body 7 reciprocates along the shaft 6, the knob 8 reciprocates on the indicator portion 5. At this time, the ring 10 is moved together with the sliding body 7 while kept in contact with the shaft 6. Therefore, the sliding body 7 operates stably, and the human operator can obtain a certain feeling of operation. A pressure-applying member 11 is formed by bending a resilient metal wire. Both ends of the member 11 are inserted in the sliding body 7 and firmly secured to it. The bent portion of the member 11 protrudes downward from the bottom of the sliding body 7.

Figure 4:
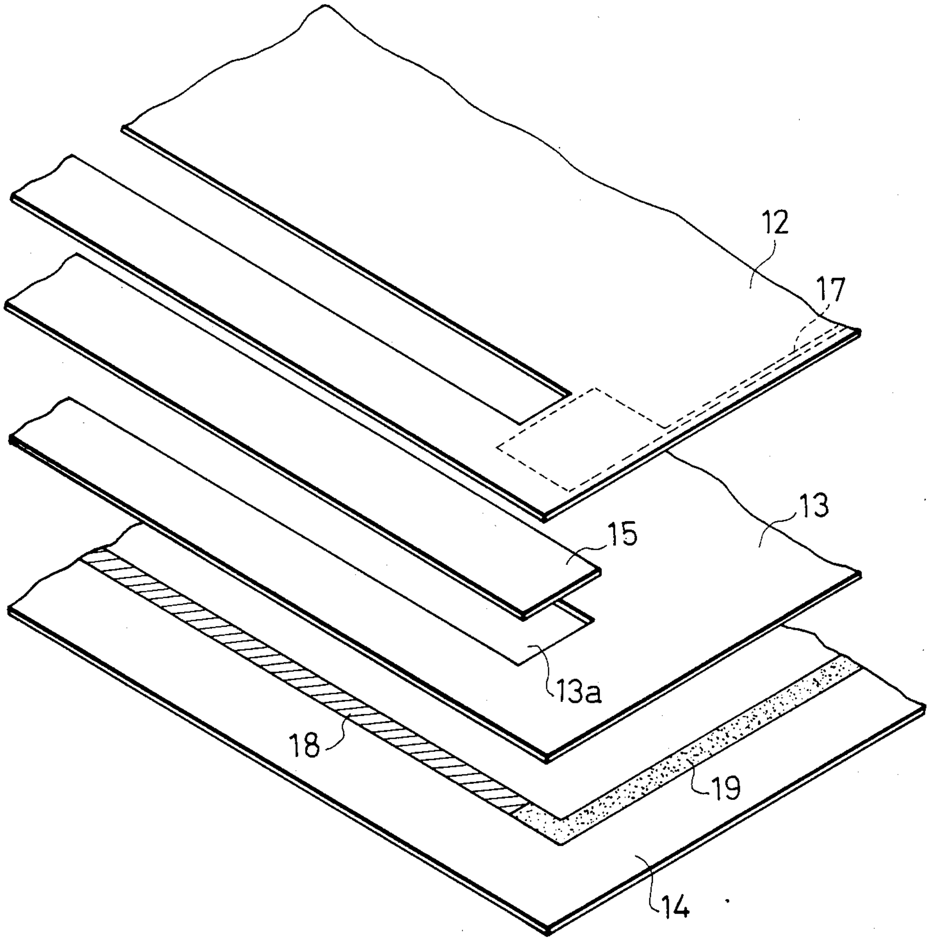
FIG. 4 is an exploded perspective view of the laminated sheet of the rheostat shown in FIG. 1.
Figure 5:
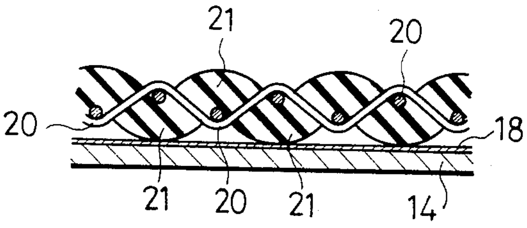
FIG. 5 is a cross sectional view of the pressure-sensitive sheet of the rheostat shown in FIG. 1 and in which no pressure is applied.
Figure 6:
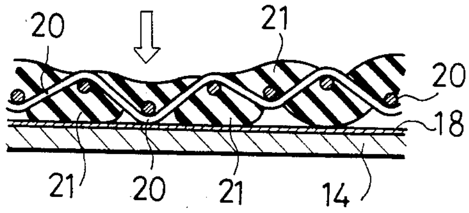
FIG. 6 is a cross-sectional view of the pressure-sensitive sheet of the rheostat shown in FIG. 1 and in which a pressure is applied to the sheet.

Placed on the underside of the upper baseplate 1 is a laminated sheet 16 consisting of an upper sheet 12, an insulating sheet 13, a lower sheet 14, and a pressure-sensitive sheet 15. The sheets 12, 13, and 14 are made of a transparent film made from polyimide, polyamide, or the like. As shown in FIG. 4, electrodes 17 which are made from a conductive material such as silver paste are printed on the underside of the upper sheet 12. Printed on the upper surface of the lower sheet 14 are a resistance layer 18 made from a resistive paste and a charge-collecting layer 19 made from a conductive material such as silver paste. The insulating sheet 13 is placed between the upper sheet 12 and the lower sheet 14, and acts to insulate the electrodes 17 from the resistance layer 18 and the charge-collecting layer 19. The insulating sheet 13 is provided with a long hole 13*a* in which the pressure-sensitive sheet 15 is placed except for its end portion that is placed on the sheet 13. As shown in FIGS. 5 and 6, the pressure-sensitive sheet 15 consists of an uneven conductive mesh 20 and an elastic insulator 21 made of silicone rubber, for example. The insulator 21 protrudes above the convex portions of the mesh 20 but does not cover these convex portions. When no pressure is applied, as shown in FIG. 5, gaps are formed between the mesh 20 and the resistance layer 18 on account of the interposition of the insulator 21, whereby the conductive mesh 20 is separated and insulated from the resistance layer 18. When a pressure is applied to one point of the pressure-sensitive sheet 15 in the direction as indicated by the arrow, as shown in FIG. 6, the convex portions of the mesh 20 in the vicinity of the pressed point are brought into contact with the resistance layer 18, thus forming an electrically conductive path across them.

Disposed on the underside of the laminated sheet 16 constructed as described above is a lower baseplate 22 which is made from a synthetic resin having a good transparency such as acrylic resin. The laminated sheet 16 is held between the lower baseplate 22 and the upper baseplate 1, so that the end portion of the pressure-sensitive sheet 15 placed on the insulating sheet 13 is pressed on the electrodes 17. Thus, the convex portions of the mesh 20 are in contact with the electrodes 17 to keep the sheet 15 electrically connected to the electrodes 17. Most of the sheet 15, except for its end portion, is placed on the resistance layer 18 and is held between the lower baseplate 22 and the pressure-applying member 11 via the lower sheet 14. When the sheet 15 is electrically connected with the resistance layer 18, only the portions pressed by the member 11 conduct, as described above, the remaining portions being maintained insulated.

Figure 1:
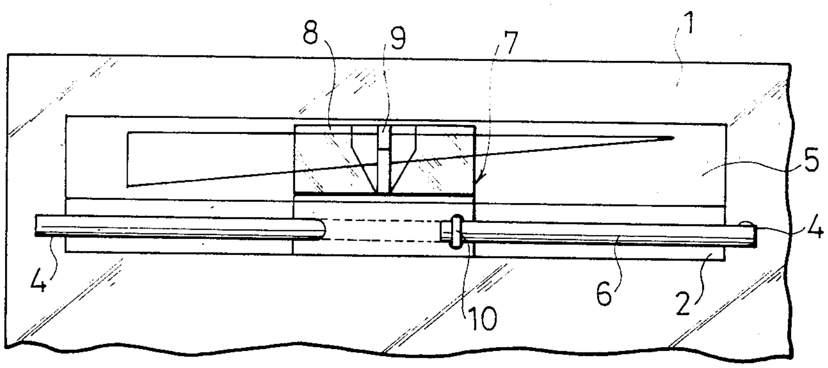
FIG. 1 is a plan view of an illuminated slide rheostat according to the invention.
Figure 2:
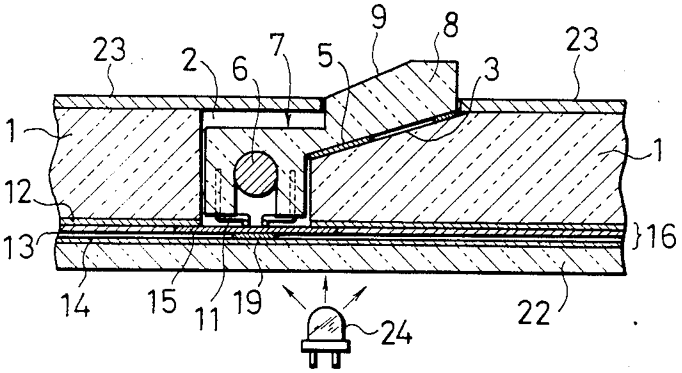
FIG. 2 is a longitudinal cross section of the rheostat shown in FIG. 1.

Referring specifically to FIG. 2, a display panel 23 is made of a sheet of aluminum or the like and has the aforementioned indicator portion 5. The panel 23 is stuck to the upper surface of the upper baseplate 1 in such a way that all of it except for the indicator portion 5 is concealed. A light-emitting device 24 such as a light-emitting diode is disposed below the lower baseplate 22. The light emitted by the device 24 is transmitted through the lower baseplate 22, the laminated sheet 16, the upper baseplate 1, and the transparent region **5*b* of the indicator portion 5, and then a part of it directly reaches the outside. The other part of the light reaches the outside after passing through the knob 8 placed on the indicator portion 5**.

In the operation of the rheostat constructed as thus far described, when the sliding body 7 is reciprocated along the guide shaft 6, the pressure-applying member 11 attached to the body 7 slides on the pressure-sensitive sheet 15 while applying a pressure on it. Before the application of this pressure, the elastic insulator 21 separates the conductive mesh 20 from the resistance layer 18 disposed on the underside of the sheet 15, and the sheet 15 is insulated from the layer 18. By the application of the pressure, the convex portions of the mesh 20 are pressed in contact with the resistance layer 18 so that the layer 18 and the electrodes 17 are brought into conduction via the mesh 20. In this way, any desired resistance value can be obtained by reciprocating the sliding body 7 to move the position of the pressure application of the pressure-applying member 11 relative to the sheet 15. The position of the sliding body 7 can be checked by watching the pointer 9 on the knob 8 and the indicator portion 5 on the underside of the knob 8. At night or in the dark, the light-emitting device 24 may be lit to permit the check, when the light emitted by the device 24 is transmitted through the lower baseplate 22, the laminated sheet 16, the upper baseplate 1, and the transparent region **5*b* of the indicator portion 5. Then, a part of it directly reaches the outside, while the other part arrives at the outside after passing through the knob 8. Therefore, the light from the transparent region 5*b* allows one to check the positional relation between the pointer 9 and the indicator portion 5** in the nighttime.

As mentioned above, in the novel illuminated slide rheostat, the laminated sheet including the resistance layer is held between the upper and lower baseplates which are made from a material having a good transparency, enabling one to check the light from the light source through the lower and upper baseplates, the sliding body, and other components. Consequently, it is possible to check the position of the knob without the need to install a light-emitting diode on the reciprocating sliding body. This permits the knob, the upper baseplate serving to guide the knob, and other parts to be made thin. Thus, the whole rheostat can be fabricated in the form of a thin structure. Further, it is easy to check the position of the knob relative to the indicator portion, because the knob makes a reciprocating motion just above the indicator portion including the components which transmit light.

While a preferred embodiment has been described, variations thereto will occur to those skilled in the art within the scope of the present inventive concepts which are delineated by the following claims.

What is claimed is:

1. An illuminated slide rheostat comprising:

an upper baseplate and a lower baseplate both of which are made from a transparent material;

a lower sheet including a resistance layer;

a pressure-sensitive sheet which, when pressed, cooperates with the resistance layer to form an electrically conductive path;

an upper sheet having electrodes which are electrically connected with the pressure-sensitive sheet;

an insulating sheet that insulates the resistance layer from the electrodes;

the lower sheet, the pressure-sensitive sheet, the upper sheet, and the insulating sheet being disposed between the upper baseplate and the lower baseplate;

an indicator portion formed in the upper baseplate and having a transparent region;

a guide member installed in the upper baseplate and extending straight;

a sliding body made from a transparent material fitted in the guide member in such a way that it can reciprocate;

a knob formed on the sliding body located adjacent the indicator portion; and a pressure-applying member installed in the sliding member and sliding on the pressure-sensitive sheet.

2. An illuminated slide rheostat as set forth in claim 1, further comprising a light-emitting device disposed below the lower baseplate.

3. An illuminated slide rheostat as set forth in claim 1, further comprising an opaque pointer formed on the transparent knob.

* * * * *